Patented Sept. 11, 1934

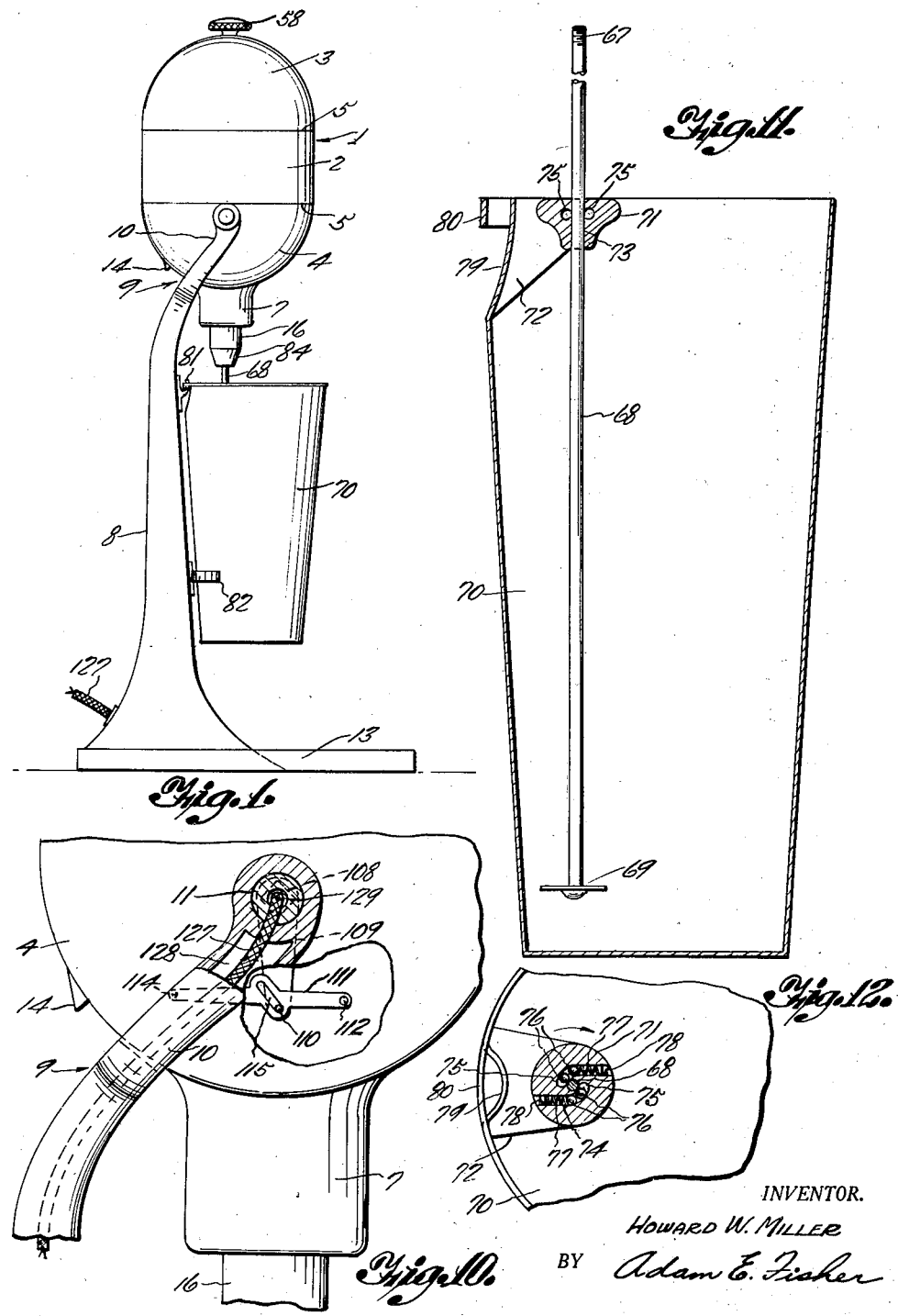

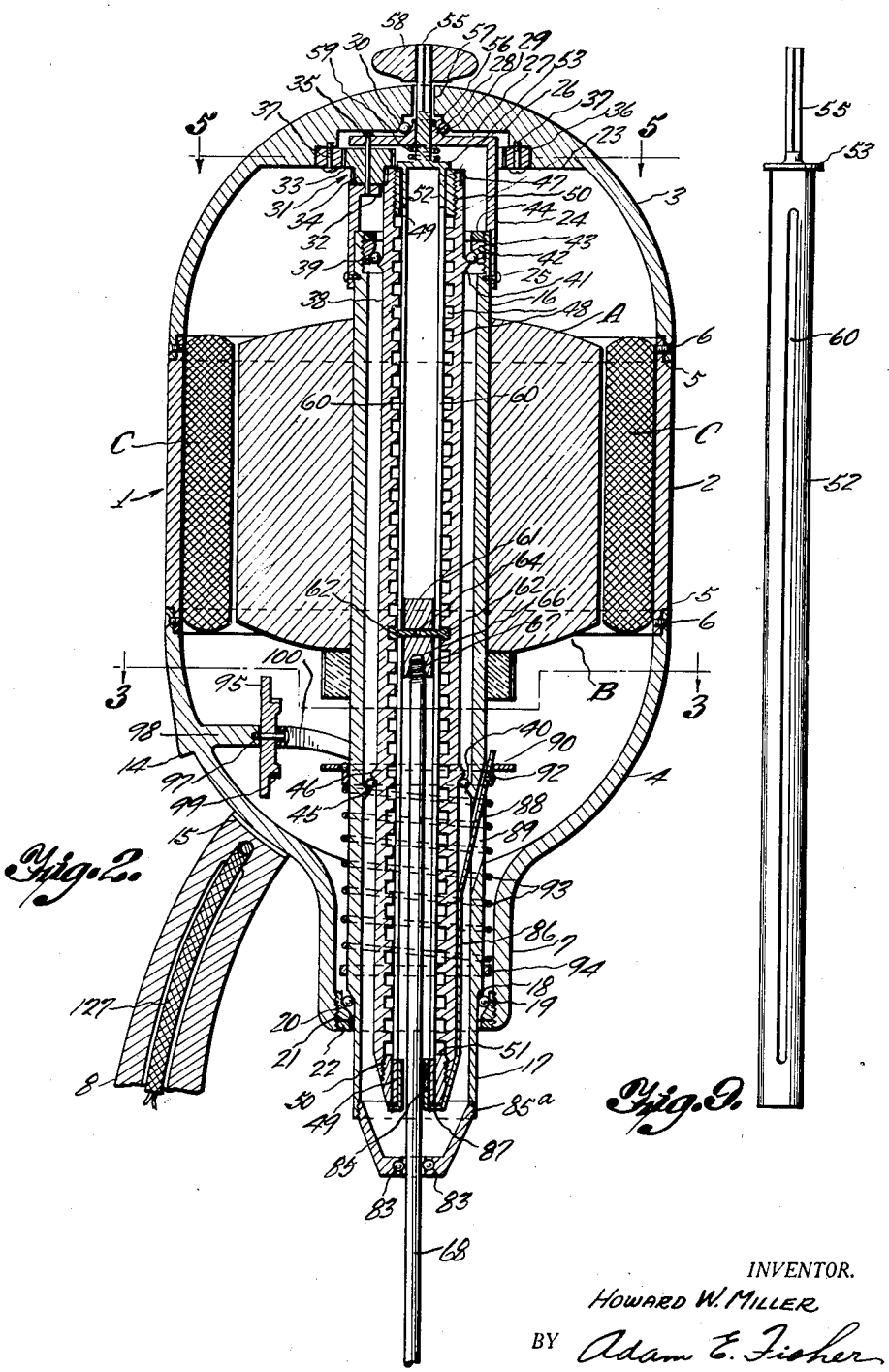

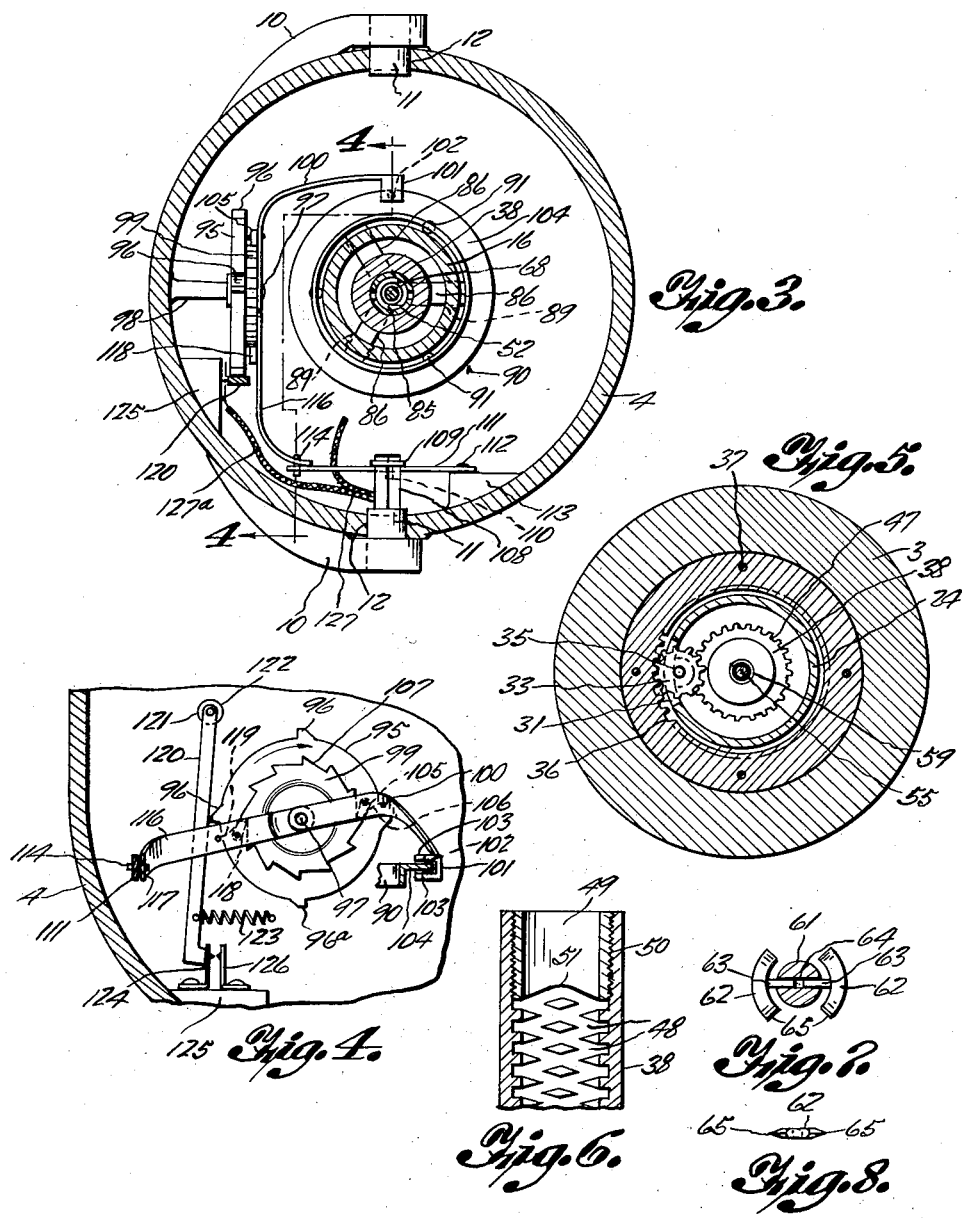

1,973,091

UNITED STATES PATENT OFFICE 1,973,091

DRINK MIXER

Howard W. Miller, Wausau, Wis.

Application September 22, 1932, Serial No. 634,313

12 Claims. (Cl. 259—99)

My invention relates to improvements in drink mixers of the kind used at the soda fountains for mixing beverages such as malted milk and the like.

The main object of my invention is to provide a mixer of this kind in which the driving motor is pivotally supported in a suitable stand and is arranged to be automatically started as it is swung inward in the process of placing the mixing receptacle or can beneath the motor for mixing the drink, the motor then being automatically shut off after it has run for a period of time sufficient to thoroughly mix the drink.

Another and important object is to provide a machine of this kind in which the agitator element as it is rotated by the motor also moves upward and downward in and through the drink to effect a more complete mixture thereof.

Another object is to provide a machine of this kind in which the agitator element is attached to the receptacle or can and is removable or detachable from the motor whereby it will be readily cleaned each time the receptacle is cleaned for further use.

A further object is to provide a machine of this kind in an efficient, durable and relatively simple form.

With these and other objects in view the invention resides in the novel construction and arrangement of parts as hereinafter set forth and claimed, reference being had to the accompanying drawings wherein:

Figure 1 is a side view of the drink mixer showing a drink receptacle in position for use.

Figure 2 is an enlarged vertical and medial cross section through the motor, housing and associated parts.

Figure 3 is a horizontal section along the line 3—3 in Figure 2.

Figure 4 is a view taken along the line 4—4 in Figure 3.

Figure 5 is a horizontal section along the line 5—5 in Figure 2.

Figure 6 is an enlarged cross section through the upper part of the agitator operating sleeve.

Figure 7 is an enlarged horizontal section through the agitator carrier showing the raising and lowering wings or pawls.

Figure 8 is an enlarged end elevation of one of the wings or pawls alone.

Figure 9 is a detached elevation of the agitator carrier guide.

Figure 10 is a fragmental enlarged side elevation showing the pivotal connection between the stand and motor housing a part being broken away and shown in section.

Figure 11 is an enlarged vertical cross section through the drink receptacle or can showing the agitator element attached thereto.

Figure 12 is a fragmentary plan view of the structure in Figure 11 showing the connection between receptacle and agitator element in horizontal cross section.

Referring now with more particularity to the drawings the reference character 1 designates generally a motor housing comprising the annular center ring 2 and the substantially hemispherical or rounded upper and lower ends 3 and 4 joined to the ring 2 along the lines 5 by screws 6. The lower end 4 has a reduced and downwardly extended hollow neck 7. The housing 1 thus formed is adapted to be mounted on a stand 8 which has a fork 9 at its upper end forming spaced arms 10 adapted to embrace the said housing and having trunnions 11 at their ends pivotally seated in bearings 12 formed in the lower housing end 4 just below the lower parting line 5 of the housing. The stand 8 is secured to or formed integrally with a base 13 and is supported thereon. The housing 1 may thus be swung outward at its lower end, this movement being limited in its outward extent by a stop 14 cast on the lower end 4 and adapted to strike the junction 15 of the stand arms 10 as will be understood in Figure 2.

An outer drive shell or sleeve 16 is disposed vertically and centrally in the housing 1 and is journaled therein at its lower end by reducing this end at 17 and forming an angular ball race or rest 18 running on ball bearings 19 held in the neck 7 by a race 20 threaded at 21 in the said neck and locked by a lock ring 22. The upper end of the shell 16 terminates short of the squared or flat inner face 23 of the upper housing end 3 and a cap 24 is secured by screws 25 to this upper end of the shell and extends into a recess 26 cut in said end face 23, the top 27 of the cap having an annular and angular bearing race 28 rolling on ball bearings 29 held in place by an angular race 30 cut in the housing end as shown. The drive sleeve 16 is thus journaled freely in the housing and the armature A of the electric motor B is secured directly to or built upon this sleeve, the field coils C being then disposed around and within the center housing ring 2. The armature as it rotates will thus of course rotate the drive sleeve 16 in its bearings.

An aperture 31 is formed in one side of the cap 24 near its top 27 and a portion of the side wall of this cap below this aperture is bent inwardly to form a mounting ear 32. A drive pinion having a large toothed gear 33 and smaller gear 34 beneath is mounted in the aperture 31 and is journaled therein by a pin 35 passed through the top of the cap down into the ear 32. An internal gear 36 is secured by screws 37 to the cap end 3 concentric with the drive sleeve 16 and is meshed with the large gear 33 of the drive pinion whereby said pinion will be rotated as it is carried around the internal gear by the rotating drive sleeve.

An agitator operating sleeve 38 considerably smaller in diameter than the drive sleeve 16 is journaled concentrically therein by upper and lower ball bearings 39 and 40, the upper bearings 39 running in a race 41 on the sleeve 38 and a race 42 threaded at 43 in the upper end of the sleeve 16 and locked by a lock ring 44 and the lower bearings 40 running in fixed rows 45 and 46 formed on the outer face of the sleeve 38 and the inner face of the sleeve 16 respectively. It will be noted that all the bearings 19, 29, 39 and 40 are adapted to act both as radial and thrust bearings. The agitator operating sleeve 38 extends to the lower end of drive sleeve 16 at its lower end and extends at its upper end into the cap 24 and has gear teeth 47 formed around its upper end meshing with the smaller gear 34 of the drive pinion. The sleeve 38 has reverse or double spiral grooves or threads 48 cut in its inner wall which terminate short of its upper and lower ends and conventional reversing collars 49 are threaded at 50 in these ends, the curved or concaved inner ends 51 of these collars falling just short of the end grooves for a conventional purpose as will be pointed out.

A carrier guide tube 52 is provided and is of such diameter as to fit freely and nicely into the bore of the agitator operating sleeve 38 wherein it is mounted, the said tube having a closed and flanged upper end 53 overlying the upper end of the upper reversing collar 49 while its lower end terminates flush with the lower end of the sleeve 38. A squared operating stub or stem 55 is extended upwardly from the end 53 of the tube 52 and passes through a square opening 56 formed in the closed end 27 of the cap 24 and thence freely upward through an aperture 57 in the housing end 3 and is provided outwardly of this housing with a rigidly mounted knob 58. An expansion coil spring 59 is coiled around the stem 55 and braced between the tube end 53 and the cap end 27 so as to hold the tube 52 downward in the sleeve 38. The carrier guide tube 52 has longitudinal and diametrically opposed slots 60 extended substantially from end to end but terminating short of its upper and lower ends as shown.

An agitator carrier 61 of circular cross section is provided and is slidably mounted in the carrier guide tube 52. Guide wings or pawls 62 are attached to this carrier 61 by their extended stems 63 slidably mounted in a diametrically extended passage 64 in the said carrier, the said stems 63 being passed also slidably through the slots 60 in the tube 52 whereby the wings 62 are disposed outside the tube 52 and arranged to play in the spiral grooves 48 in the sleeve 38. To facilitate their movement through the grooves 48 the wings 62 are of arcuate form and taper toward their ends as shown at 65. The carrier 61 has a threaded socket 66 formed in its lower end in which may be screwed the upper threaded end 67 of the stem 68, of a conventional agitator 69.

In the operation of the structure so far recited and assuming that the agitator stem 68 is threaded in the socket 66 in its carrier 61, the motor B as it rotates will carry the outer driving sleeve 16 around with its armature A and will rotate the drive pinion causing the lower and smaller gear 34 thereof to rotate the agitator operating sleeve 38 through the gear teeth 47 formed thereon. Said sleeve 38 is thus driven by the gears in the same direction as the motor and sleeve 16 but at a different speed due to the ratio of the gears. At the same time the carrier guide tube 52 is driven directly by and in the same direction as the drive sleeve 16 by the square stem 55 and so rotates rapidly within the sleeve 38 in the same direction. Further assuming that initially the agitator carrier 61 is at the bottom of the tube 52 this difference in the speed of rotation of the tube 52 and sleeve 38 will rotate the carrier and of course the agitator 69 and at the same time the pawls 62 will climb in the grooves 48 in the sleeve 38 carrying the carrier and agitator slowly upward in the tube 52. When the carrier 61 reaches the upper end of the tube 52 the pawls 62 will strike the upper reversing collar 49 whose concaved end 51 will then direct the pawls downward into the grooves 48 so that the carrier will move back down through the guide tube. As the carrier reaches the lower extremity of its travel the pawls 62 will engage the lower reversing collar 49 and will be directed thereby back up through the grooves 48 as will be readily understood. This operation will be continued as long as the motor runs. It will be noted that the agitator 69 is thus rotated in the same direction and at the same speed as the motor B, the direction of rotation of the agitator being clockwise as viewed from the top and as shown by the arrow in Figure 12.

As shown in Figures 1, 11 and 12 the agitator 69 is permanently and rotatably attached to the mixing can or container 70 by passing the stem 68 through a bearing block 71 supported by a bracket 72 at the upper end of the can and near the margin thereof. This bearing block 71 has a vertical bore 73 extended in parallelism with the vertical axis of the can 70 through which said stem 68 is slidably and rotatably mounted and a locking device is provided to lock the stem against rotation in the opposite direction to its normal movement when driven by the motor B. This locking device comprises opposite tortuous passages 74 extended horizontally into the bearing block 71 and at their inner ends curving around and inward toward and merging with the bore 73 therein. These inner curved ends 75 are directed in a counterclockwise direction as viewed from the top in Figure 12 and oppositely to the normal clockwise direction of rotation of the stem 68. Locking balls 76 are disposed in the passages 74 and are normally forced inwardly therein by expansion coil springs 77 held in the passages by threaded plugs 78. As the stem 68 rotates in its normal clockwise direction the locking balls 76 will be forced outward in the passages 74 allowing the stem to rotate freely but in the opposite direction the balls will be forced inward and jammed against the stem frictionally locking or retarding it against rotation as will be understood. The agitator stem may thus be unscrewed from the carrier 61 by turning the knob 58 in a counter-clockwise direction. The can 70 has a portion of its upper margin formed inwardly adjacent the bearing block 71 at 79 and has an arcuate hanger strip or bar 80 disposed over this portion so that the can may be supported on the stand 8 by slipping this strip 80 over the hook 81 on the stand. Near its lower end the can 70 then rests against and in an arcuate supporting bracket 82 on the stand.

The agitator stem 68 passes through and between ball bearings 83 arranged in a tapered end piece or cap 84 threaded at 85a in the lower end of the outer drive sleeve 16 as shown.

To control the motor B and shut it off after a predetermined time I provide a control switch now to be described. A switch operating cage or frame is provided comprising a cylindrical member 85 slidably mounted in the lower end of the carrier guide tube 52 around the agitator stem 68 and so disposed that each time the agitator carrier 61 moves to the lower end of the tube 52 it will strike this member 85 and force it downwardly for some distance. Three equally spaced arms 86 are extended from the lower and outwardly flared end 87 of the member 85 and extend upward along side the carrier operating sleeve 38 for some distance and then flare angularly outward at their ends 88 and pass loosely through angular slots 89 cut in the walls of the outer drive sleeve 16. A ring 90 is rotatably and slidably mounted around the sleeve 16 by ball bearings 91 and these upper flared ends 88 of the arms 86 are secured to this ring by screws 92. The arrangement is such that the aforesaid downward movement of the member 85 will be transmitted to the ring 90 causing it to move downward on the sleeve 6. The ring 90 is normally urged upward and held by an expansion coil spring 93 coiled around the sleeve 16 and braced between said ring and a collar 94 fixed on the sleeve beneath.

A circular switch operating cam 95 having four equally spaced radially projecting lugs 96 is rotatably mounted by a pin 97 on a bearing post 98 extended inwardly from the lower end 4 of the motor housing 1 and a ratchet wheel 99 is formed on or secured to the face of this cam to rotate therewith. An arm 100 is pivotally attached by one end to the pin 97 and extends outward along the face of the ratchet wheel 99 and then is bent and extended inwardly toward the ring 90 on the sleeve 16, said arm terminating in a U-shaped fork 101 having ball bearings 102 in its spaced legs 103 which are adapted to embrace or straddle the horizontal flange 104 of said ring 90. The arm 100 carries a dog 105 with a conventional spring 106 holding it normally in engagement with the teeth 107 of the ratchet wheel 99.

One of the trunnions 11 in the stand arms 10 has a square extension 108 on which is rigidly affixed a crank arm 109 having a pin 110 in its lower end. A lever 111 is pivoted at one end 112 to a bearing 113 on the housing end 4 and passes beneath the said extension 108 and has a pin 114 in its free end. Intermediate its ends the lever 111 has an angularly extended slot 115 in which the pin 110 on the crank arm 109 plays and the arrangement is such that the inward movement of the lower end of the motor housing 1 in the stand 8 after it has been swung out to insert the agitator stem will cause said lever 111 to move upward at its free end by the cam-like action of the pin 110 in the slot 115. A motor starting arm 116 is pivotally mounted at one end on the pin 97 and extends radially outward across the face of the ratchet wheel 99 in direction opposite to the arm 100 and at its free end is bent inwardly and forked at 117 to engage the pin 114 at the end of the lever 111. This arm 116 also has a conventional dog 118 and spring 119 holding the dog in engagement with the ratchet wheel teeth 107.

A switch lever 120 is pivoted at its upper end at 121 to an arm 122 extended inwardly from the motor housing 1 and passes downward alongside the periphery of the switch operating cam 95 and is held in engagement therewith by a retractile coil spring 123 arranged as shown. At its lower end the lever 120 engages a flexible switch contact 124 mounted on an insulating block 125 secured in the motor housing and the spring 123 normally causes said lever 120 to force this contact 124 into electrical engagement with the fixed contact 126. The wires 127 leading to the motor B are trained up through the stand 8 and the passage 128 in the hollow arm 10 and thence through a bore 129 in the trunnion after which one wire 127a goes to the switch contacts 124 and 126 and thence to the motor B in well known manner so that said switch contacts open and close the circuit to the motor.

The operation of the machine as a whole will now be described. With the switch parts in the positions shown in the drawings and assuming that the agitator carrier 61 is at the lower end of its guide tube 52 the elements of the drink to be mixed are placed in the can 70 and the motor housing 1 is swung outward at its lower end and the agitator stem 68 is projected up into the housing until its threaded end 67 meets the socket 68 in the carrier. The return movement or swing of the motor housing moves the free end of the lever 111 upward as aforesaid and so the starting arm 116 is swung upward causing the dog 118 thereon to rotate the ratchet wheel 99 in a clockwise direction as indicated in Figure 4 a distance equal to one tooth 107. At the same time the cam 95 is rotated a short distance moving the lug 96 from engagement with the switch lever 120 and allowing the spring 123 to pull said lever over and force the switch contact 124 into engagement with the contact 126 closing the circuit and starting the motor B. The motor then rotates the agitator carrier 61 and screws the agitator stem 68 into its socket 66, after which the can 70 is hung on the hook 81 on the stand 8. The carrier 61 as it is rotated then moves upward through the tube 52 as aforesaid to the upper end and then back to the lower end and as it reaches the lower end it strikes the member 85 pulling the ring 90 down on the drive sleeve 16. This action is transmitted to the lever 100 and the dog 105 thereon is caused to rotate the wheel 99 and cam 95 in a clockwise direction a distance equal to one tooth 107. The upward and downward travel of the agitator carrier 61 is then repeated and the wheel 99 and cam 95 moved one tooth for each operation. In the embodiment here shown the ratchet wheel 99 has twelve teeth and upon the third downward movement of the carrier 61 the resulting movement of the wheel 99 and cam 95 will bring the next lug 96a into engagement with the switch lever 120 and will force the same outward freeing the switch contact 124 and opening the circuit to the motor B. The parts are then again in the position shown herein and the agitator stem 68 may be released by turning the knob 58 as aforesaid and the can 70 removed to dispense the drink. It is thought that the operation will be fully understood without further description and it will be obvious that by varying the number of teeth in the ratchet wheel 99 the motor B may be allowed to run for any desired period of time.

As the agitator 69 moves upward and downward through the drink in the can it is of course rotated and a very complete mixing of the drink is thus effected.

While I have herein set forth a certain preferred embodiment of my invention it is understood that I may vary from the same in minor structural details so as best to construct a practical device for the purposes intended, not departing from the spirit of the invention and within the scope of the appended claims.

I claim:

1. In a device of the kind described, a stand, a housing pivoted in the stand, a motor in the housing, an agitator carrier mounted in the housing, means for connecting an agitator to the agitator carrier, means for rotating the said carrier in the housing, and means for simultaneously and vertically reciprocating the agitator carrier in the housing, and a motor control switch operable by movement of the housing in the stand to close the circuit to the motor and operable by the reciprocation of the agitator carrier to open the circuit to the motor after a predetermined time.

2. In a device of the kind described, a housing, a motor in the housing, an agitator carrier mounted in the housing, means for connecting a drink agitator to the agitator carrier, means connecting the motor and agitator carrier for simultaneously rotating and reciprocating the latter, a control switch for the motor, manually operated means for closing the said control switch, automatically operated means for opening the said control switch after a predetermined number of movements of the said agitator carrier, and means for disconnecting the drink agitator from the agitator carrier.

3. In a device of the kind described, a motor housing, a motor in the housing, a drive sleeve driven by the motor, a guide tube driven by the drive sleeve, an operating sleeve mounted between the drive sleeve and guide tube, means for driving the operating sleeve in the same direction as the motor but at a different speed, the said operating sleeve having reverse spiral grooves, a carrier slidably mounted in the guide tube, pawls on the said carrier playing in the grooves in the operating sleeve, and an agitator detachably connected to the carrier.

4. In a device of the kind described, a motor housing, a motor in the housing, a drive sleeve driven by the motor, a guide tube, means for driving the guide tube from the drive sleeve and at a different speed, an operating sleeve mounted between the drive sleeve and guide tube, means for driving the operating sleeve in the same direction as the motor but at a different speed, the said operating sleeve having reverse spiral grooves, a carrier slidably mounted in the guide tube, pawls on the said carrier playing in the grooves in the operating sleeve, and an agitator detachably connected to the carrier, and a switch operated by the carrier to open the circuit to the motor after a predetermined period.

5. In a device of the kind described, a motor housing, a motor in the housing, a drive sleeve and guide tube rotated by the motor, an operating sleeve having reverse spiral grooves, means for rotating the operating sleeve in the same direction as that of the drive sleeve and guide tube but at a different speed, an agitator carrier slidably mounted in the guide tube, pawls on the said carrier playing in the said grooves in the operating sleeve whereby the said carrier will travel from top to bottom in the guide tube, a motor control switch for the motor, and means operable by the said agitator carrier whereby said switch will be opened after a predetermined number of upward and downward movements of the carrier in the guide tube.

6. In a device of the kind described, a stand, a motor housing pivotally mounted in the stand to swing outward therein, a motor in the housing, a drive sleeve, a guide tube mounted concentrically in the drive sleeve, an operating sleeve around the guide tube, means for rotating the drive sleeve, guide tube, and operating sleeve in the same direction but at different speeds, the said guide tube having longitudinal slots and the operating sleeve having reverse spiral grooves in its inner surface, an agitator carrier slidably mounted in the guide tube, pawls adapted to play in the said spiral grooves and including stems slidably mounted through the slots in the guide tube and connected to the said agitator carrier, the said agitator carrier having means for connection to an agitator.

7. In a device of the kind described, a stand, a motor housing pivotally mounted in the stand to swing outward therein, a motor in the housing, a drive sleeve, a guide tube mounted concentrically in the drive sleeve, an operating sleeve around the guide tube, means for rotating the drive sleeve, guide tube and operating sleeve in the same direction but at different speeds, the said guide tube having longitudinal slots and the operating sleeve having reverse spiral grooves in its inner surface, an agitator carrier slidably mounted in the guide tube, pawls adapted to play in said spiral grooves and including stems slidably mounted through the slots in the guide tube and connected to the said agitator carrier, the said agitator carrier having means for connecting to an agitator, a motor control switch for the motor, operating means for the motor control switch whereby the same will be closed as the motor housing is swung inward in the stand, and opened after the agitator carrier has operated for a predetermined period.

8. In a device of the kind described, a housing, a motor mounted in the housing, a drive sleeve journaled in the housing, and connected to the motor, a guide tube mounted concentrically in the drive sleeve and connected thereto, an agitator carrier slidably mounted in the guide tube and arranged to rotate therewith, means for reciprocating the said agitator carrier in the guide tube, a tubular member slidably mounted in one end of the guide tube and adapted to be forced outward therein by the agitator carrier as it reaches the end of the guide tube, a ring slidably mounted on the drive tube, arms connecting the said tubular member and ring, a cam, a ratchet wheel connected to the cam, an arm pivoted on the ratchet wheel, a dog on the arm, in engagement with the teeth of the ratchet wheel, a fork on the free end of the arm engaging the said ring on the drive tube, spaced switch contacts, a switch lever spring set to normally close the said switch contacts and bear against the periphery of the cam, and manually operated means for moving the said switch lever out of engagement with the said switch contacts.

9. In a device of the kind described, a housing, a motor in the housing, a drive sleeve journaled in the housing through the motor and driven thereby, a guide sleeve mounted concentrically within the drive sleeve and connected thereto at one end the said guide sleeve having longitudinal slots, an operating sleeve journaled between the drive and guide sleeves, the said operating sleeve having reverse spiral grooves in its inner face gears connecting the drive sleeve and operating sleeve whereby the latter is driven in the same direction as the former but at a different speed, an agitator carrier slidably mounted within the guide sleeve and guide means extended from said agitator carrier through the slots in the guide sleeve and into the grooves in the operating sleeve whereby the carrier will be reciprocated in the guide sleeve by the differential rotation of the operating sleeve.

10. In a device of the kind described, a motor housing, a motor therein, an agitator carrier mounted in the housing and reciprocated therein by the motor, a motor control switch, a cam for operating the said control switch, a ratchet wheel on the cam, an arm for operating the said ratchet wheel, and an actuating member disposed in the path of the agitator carrier and connected to the arm whereby said motor control switch will be opened to stop the motor after a period of reciprocation of the said agitator carrier.

11. In a device of the kind described, a housing, a motor in the housing, a guide sleeve rotated by the motor, an agitator carrier mounted on the sleeve for rotation thereby in one direction, means for manually rotating the said sleeve and carrier in the opposite direction, the said agitator carrier having a threaded socket, a container, an agitator in the container including a threaded stem adapted to be screwed into the said agitator by the rotation of the motor or unscrewed by manual rotation of the carrier and guide tube, and means on the container for locking the said agitator stem against rotation while it is unscrewed from the agitator carrier.

12. In a device of the kind described, a housing, a motor in the housing, a guide sleeve rotated by the motor, an agitator carrier mounted on the sleeve for rotation thereby in one direction, means for manually rotating the said sleeve and carrier in the opposite direction, the said agitator carrier having a threaded socket, a container, an agitator in the container including a threaded stem adapted to be screwed into the said agitator by the rotation of the motor or unscrewed by manual rotation of the carrier and guide tube, and means on the container for locking the said agitator stem against rotation while it is unscrewed from the agitator carrier, the said locking means for the agitator comprising a bearing block on the container, having a bore to receive the stem and tortuous passages communicating with the bore, and balls mounted in the passages and spring set to move into wedging contact with the agitator stem while the agitator carrier is released therefrom.

HOWARD W. MILLER.